(12) United States Patent
Vadakkanmaruveedu et al.

(10) Patent No.: US 10,152,099 B2
(45) Date of Patent: Dec. 11, 2018

(54) SKIN MATERIAL DESIGN TO REDUCE TOUCH TEMPERATURE

(71) Applicant: QUALCOMM Incorporated, San Diego, CA (US)

(72) Inventors: Unnikrishnan Vadakkanmaruveedu, Phoenix, AZ (US); Jon James Anderson, Boudler, CO (US); Vinay Mitter, San Diego, CA (US); Peng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 927 days.

(21) Appl. No.: 14/594,984

(22) Filed: Jan. 12, 2015

(65) Prior Publication Data

US 2015/0261267 A1 Sep. 17, 2015

Related U.S. Application Data

(60) Provisional application No. 61/953,653, filed on Mar. 14, 2014.

(51) Int. Cl.
*G06F 1/20* (2006.01)
*H05K 7/20* (2006.01)
(Continued)

(52) U.S. Cl.
CPC .............. *G06F 1/203* (2013.01); *C09K 5/14* (2013.01); *F28F 13/003* (2013.01); *G06F 1/163* (2013.01);
(Continued)

(58) Field of Classification Search
CPC .. G06F 1/203; G06F 1/20; G06F 1/206; F28F 13/003; H05K 7/20436; H05K 7/2039
See application file for complete search history.

(56) References Cited

U.S. PATENT DOCUMENTS

2007/0184245 A1* 8/2007 Ku .................. G06F 1/181
  428/143
2007/0263352 A1* 11/2007 Jones ............... H05K 7/20418
  361/688

(Continued)

FOREIGN PATENT DOCUMENTS

EP    2806419 A1    11/2014
WO    2013108312 A1   7/2013

OTHER PUBLICATIONS

Second Written Opinion from International Application No. PCT/US2015/020559, dated Feb. 19, 2016, 8 pages.

(Continued)

*Primary Examiner* — Timothy J Thompson
*Assistant Examiner* — Amol H Patel
(74) *Attorney, Agent, or Firm* — Arent Fox LLP (57) ABSTRACT

An electronic device includes a housing with a plurality of sides and electronics components in the housing. A porous and thermally conductive material is associated with the housing. The material has a thermal conductively (k), and a porosity between 10% and 70% that results in a specific heat ($\rho$) and density ($C_p$) for the material, such that $k*\rho*C_p$ is between 0 $(J*W)/(m^4*K^2)$ and 1,000,000 $(J*W)/(m^4*K^2)$. The material may be: a glass-based material having a thermal conductivity between 0.5-2 W/m-K, a density between 1000-2500 $kg/m^3$, and a specific heat between 500-1000 J/kg-K; a metal-based material having a thermal conductivity between 300-400 W/m-K, a density between 4000-8000 $kg/m^3$, and a specific heat between 200-300 J/kg-K; and a plastic-based material having a thermal conductivity may be between 0.1-0.4 W/m-K, a density between 400-1000 $kg/m^3$, and a specific heat between 1900-2000 J/kg-K.

46 Claims, 7 Drawing Sheets

(51) Int. Cl.
*C09K 5/14* (2006.01)
*G06F 1/16* (2006.01)
*G06F 1/18* (2006.01)
*F28F 13/00* (2006.01)

(52) U.S. Cl.
CPC ............ *G06F 1/1626* (2013.01); *G06F 1/182* (2013.01); *G06F 1/20* (2013.01); *G06F 1/206* (2013.01); *G06F 2200/1633* (2013.01); *Y10T 29/49002* (2015.01); *Y10T 428/2982* (2015.01)

(56) References Cited

U.S. PATENT DOCUMENTS

2010/0300669 A1    12/2010  Jacobsen et al.
2015/0005043 A1*    1/2015  Shiraishi ............ H04M 1/0249
                                                       455/572

OTHER PUBLICATIONS

Sheppard R.G., et al., "Properties and Characteristics of Graphite for Industrial Applications," Internet Citation, Nov. 2001 (Nov. 2001), pp. 1-50, XP002598686, Retrieved from the Internet URL: http://www.poco.com/LinkClick.aspx?fileticket=GeYKfG9Sqtk%3d &tabid=192&mid=719.
Anonymous: "Polycarbonate—online catalogue source—supplier of research materials in small quantities—Goodfellow", Jan. 15, 2014 (Jan. 15, 2014), XP055196261, 3 pages.
International Search Report and Written Opinion—PCT/US2015/020559—ISA/EPO—Jun. 29, 2015.

* cited by examiner

SKIN MATERIAL DESIGN TO REDUCE TOUCH TEMPERATURE

CROSS-REFERENCE TO RELATED APPLICATION(S)

This application claims the benefit of U.S. Provisional Application Ser. No. 61/953,653, entitled "Skin Material Design To Reduce Touch Temperature" and filed on Mar. 14, 2014, which is expressly incorporated by reference herein in its entirety

BACKGROUND

Field

The present disclosure relates generally to electronic devices, and more particularly, to electronic devices having skin materials designed to reduce the temperature at the exterior surfaces of devices to thereby reduce the temperature experienced by a user when touching such devices.

Background

As handheld and portable electronic devices, such as smartphones, tablets, and watches, increase in capability and functionality, the electronic components within the devices must provide improved computational performance levels. In order to achieve these higher computational performance levels, such electronic devices dissipate increasing amounts of energy in the form of heat. Due to the compact size of typical devices, this energy can result in rapid temperature increases both within the device and at the exterior surface or skin of the device.

Human skin can be sensitive to the heat dissipated by the device surface. Accordingly, the skin or surface temperature of handheld device is a critical design constraint. Temperatures at one or more surfaces of handheld devices may become too hot to touch, thus leading to uncomfortable user experience. For example, a high temperature at any one of a housing surface, back cover surface, or liquid crystal display (LCD) surface may cause a user to place the device on a surface to continue use or to stop using the device altogether. Furthermore, high temperature surfaces can become a safety hazard due to local skin burning. Thus, it is desirable to reduce the skin temperature of a handheld device. In doing so, however, it is critical to maintain the internal temperature of handheld devices at levels that do not have a detrimental effect on the operation and longevity of internal components.

SUMMARY

An electronic device includes a housing defined by a plurality of sides, and electronics components contained in the housing. A porous and thermally conductive material is associated with at least one of the plurality of sides of the housing. The material has a thermal conductively (k), and a porosity of between 10% and 70% that results in a specific heat ($\rho$) and density ($C_p$) for the material, such that a product $k*\rho*C_p$ is between 0 $(J*W)/(m^4*K^2)$ and 1,000,000 $(J*W)/(m^4*K^2)$. The material may comprise one of: a glass-based material having a thermal conductivity between 0.5-2 W/m-K a density between 1000-2500 $kg/m^3$, and a specific heat between 500-1000 J/kg-K; a metal-based material having a thermal conductivity between 300-400 W/m-K, a density between 4000-8000 $kg/m^3$, and a specific heat between 200-300 J/kg-K; and a plastic-based material having a thermal conductivity may be between 0.1-0.4 W/m-K, a density between 400-1000 $kg/m^3$, and a specific heat between 1900-2000 J/kg-K. The porous and thermally conductive material is configured to maintain a contact temperature at the exterior surface of the at least one of the plurality of sides in a range between 30 C and 60 C, and more specifically at or near average human body temperature (37.5 C), during a steady state operation of the device. The material also maintains the junction temperature at the interior surface below a threshold level corresponding to effective operation of electronic components.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several designs of skin material that reduce surface temperature and touch temperature are presented with reference to various apparatus and methods. These apparatus and methods are described in the following detailed description and illustrated in the accompanying drawings by various blocks, modules, components, steps, processes, etc. (collectively referred to as "elements").

Figure 1:
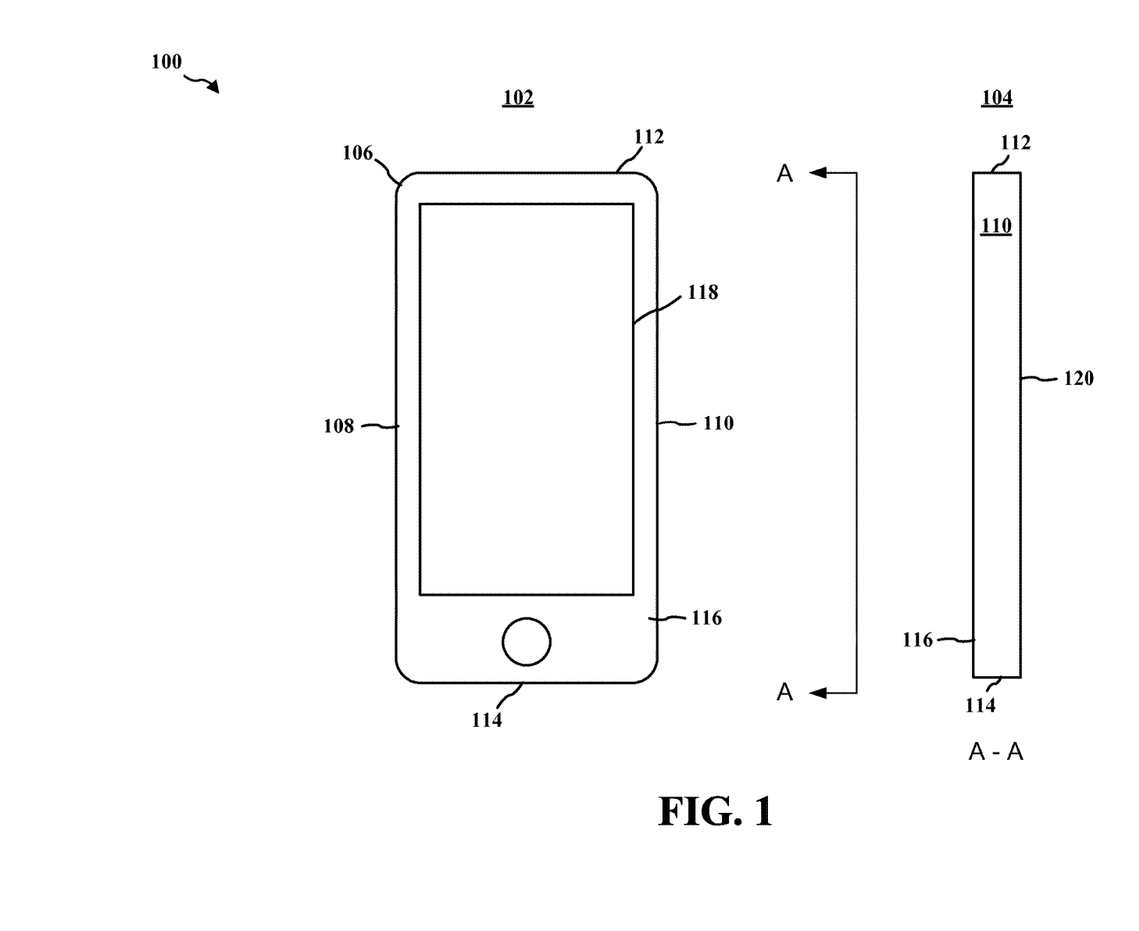
FIG. 1 is a diagram illustrating front and side views of an electronic device.

FIG. 1 is an illustration of an electronic device 100 in a front view 102 and a side view 104. The electronic device 100 includes a housing 106 defined by a number of housing components. These housing components may include a first side 108 opposite a second side 110 and a third side 112 opposite a fourth side 114. The housing components may also include a top side 116 and a bottom side 120. The housing 106 encloses the electronic components of the device 100.

In one configuration, the first side 108, the second side 110, the third side 112, the fourth side 114 and the bottom side 120 of the housing 106 may be formed as a single unitary structure—referred to herein as a housing sub-structure. The housing sub-structure may be formed using known manufacturing techniques, such as molding. Alternatively, these components 108, 110, 112, 114, 120 may be individually fabricated and then assembled to form a housing sub-structure. For example, the housing components 108, 110, 112, 114, 120 may be adhered, e.g., bonded, together to form a housing sub-structure.

During assembly of the electronic device 100, electronic components may be assembled in the housing sub-structure. Once the electronic components are assembled, a top side 116 may be placed on the housing sub-structure defined by housing components 108, 110, 112, 114, 120 to thereby form a housing 106 that encloses the electronic components of the device 100. The top side 116 may also be considered a housing sub-structure, and may include a display portion 118 formed of a glass-based material to provide a window through which a display screen (not shown) of the device is visible. In this case, two housing sub-structures—one defined by housing components 108, 110, 112, 114, 120 the other defined by housing component 116—are assembled to form a housing 106. The sides 108, 110, 112, 114, 116, 120 may be substantially planar, thus forming a housing 106 with a substantially planar exterior surface. As used herein "housing" generally refers to a structure that encloses electronic components of a device, while "housing sub-structure" generally refers to a structure that when combined with another housing sub-structure forms a housing.

The electronic device 100 may be adapted for portability. By way of example and not limitation, the electronic device 100 may be a mobile phone, a smart phone, a session initiation protocol (SIP) phone, a laptop, a notebook, a netbook, a smartbook, an ultrabook, a tablet, an e-book reader, a personal digital assistant (PDA), a global positioning system (GPS) device, a navigation device, a multimedia device, a video device, a music player, an entertainment unit, a set-top box, a fixed location data unit such as a meter reading equipment, a camera, a game console, or any other electronic device. Aspects of the present disclosure may be suitably employed in any electronic device which is adapted to come into contact with a user's skin during use.

Figure 2:
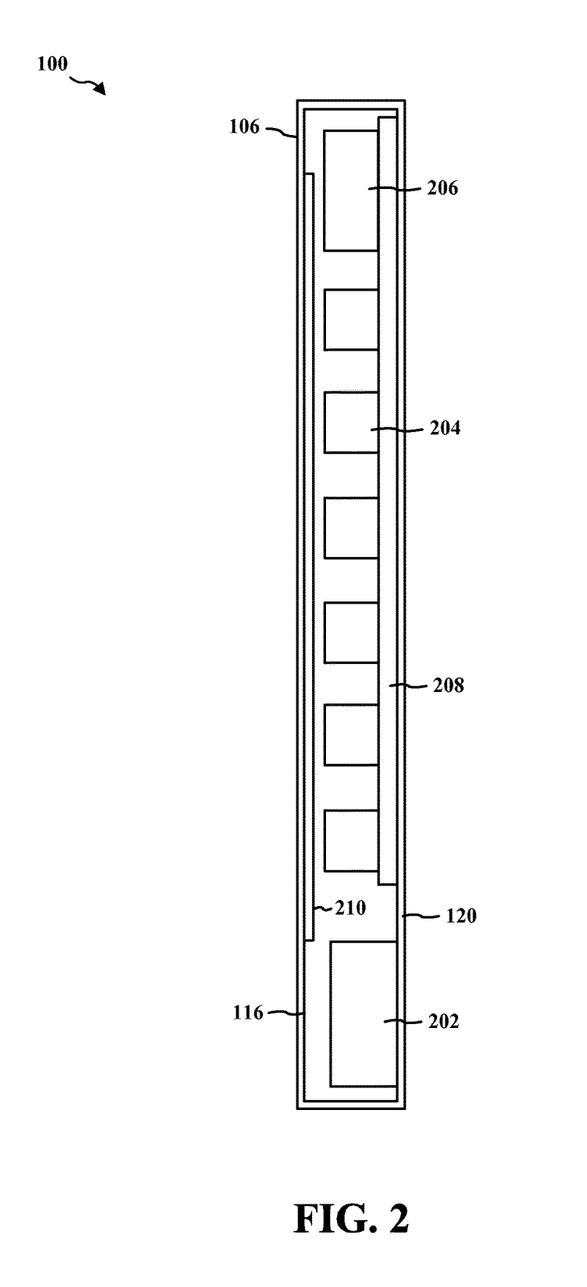
FIG. 2 is an illustration of a side view of the electronic device of FIG. 1 with interior components exposed.

FIG. 2 is an illustration of a side view of the electronic device 100 of FIG. 1 with the interior exposed. The housing 106 is sized and shaped to house one or more electronic components of the electronic device 100. For instance, the housing 106 may be configured to enclose one or more electronic components including, for example, a battery 202, various circuit chips 204 and a memory component 206 mounted on a printed wiring board 208, and a display 210.

As described above, due to the compact size of some electronic devices, heat dissipated by the electronic components of a device can result in rapid temperature increases both within the device and at the exterior surface or skin of the device. Temperatures at one or more surfaces of an electronic device may become too hot to touch, thus leading to uncomfortable user experience.

In a typical day, a person's body temperature is 36.5 C. If the surface temperature of an electronic device being touched is 45 C, the actual temperature that the person feels will be somewhere between 36.5 C and 45 C. This actual temperature is referred to as an "interface temperature" or "touch temperature." The touch temperature refers to the actual temperature felt by the user's skin, as opposed to the surface temperature of the device. The touch temperature may be obtained through measurement using, for example, a thermocouple. The "surface temperature" corresponds to the actual temperature on the surface of the device. The surface temperature may also be obtained through measurement using, for example, a thermocouple. The touch temperature that a person feels when touching an external surface or "skin" of an electronic device is a function of material properties of the external surface of the device. These material properties include thermal conductivity (k), density ($\rho$), and specific heat ($C_p$).

In accordance with aspects disclosed herein, the touch temperature that a person feels at the exterior of an electronic device may be made close to body temperature by tailoring one or more of the properties of the skin material of the electronic device. Density ($\rho$) and specific heat ($C_p$) are volumetric properties that may be controlled by changing the volume/mass of the material. As disclosed herein, density ($\rho$) and specific heat ($C_p$) may be controlled through porosity of the material, wherein an increase in porosity results in a corresponding decrease in both density and specific heat. Based on the foregoing, the structure of a material may be changed or redesigned by controlling one or more of density ($\rho$) and specific heat ($C_p$) to arrive at a new material design that provides an acceptable touch temperature.

Figure 3:
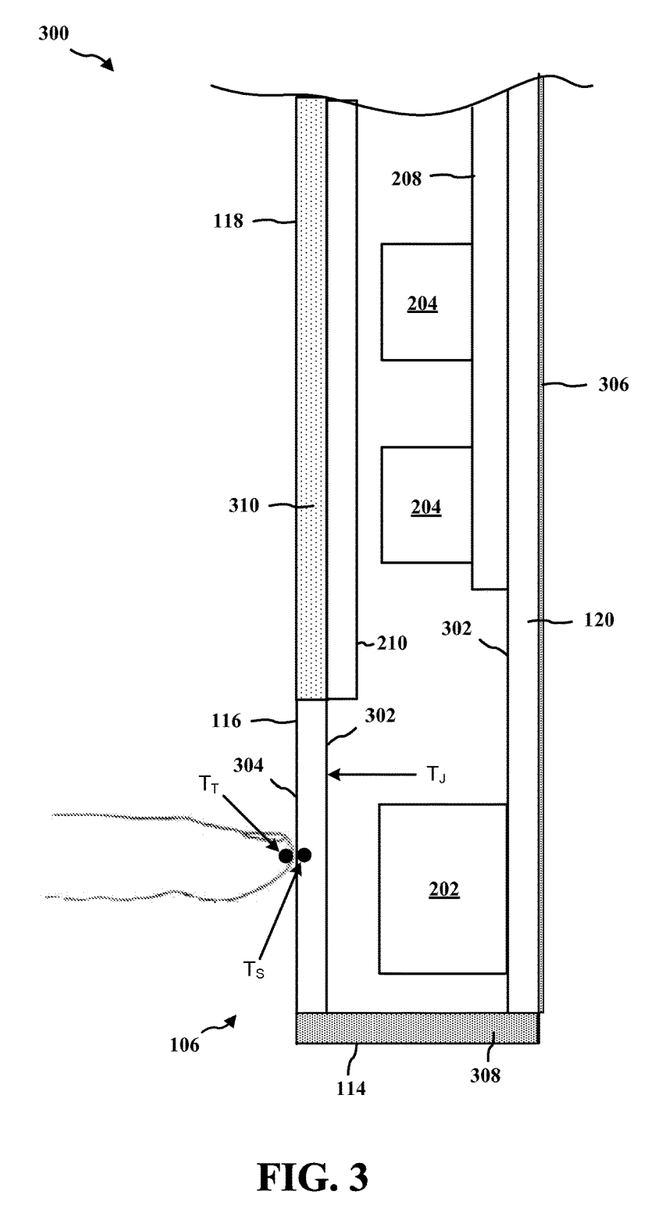
FIG. 3 is an illustration of a portion of the side view of FIG. 2, enlarged for clarity, to show inclusion of skin material that reduces the temperature at exterior surfaces of the device.

FIG. 3 is an illustration 300 of a portion of the side view of FIG. 2, enlarged for clarity. Each of the plurality of sides 114, 116, 120 of the housing 106 includes an interior surface 302 facing the internal components 202, 204 and an exterior surface 304. A finger is shown touching the exterior surface 304 of the top side 116 of the housing 106. Upon touching the exterior surface, a touch temperature ($T_T$) at the finger and a surface temperature ($T_S$) at the exterior surface 304 experience a transient thermal response, during which the respective temperatures $T_T$ and $T_S$ converge to a common temperature referred to as a contact temperature ($T_C$).

Figure 4:
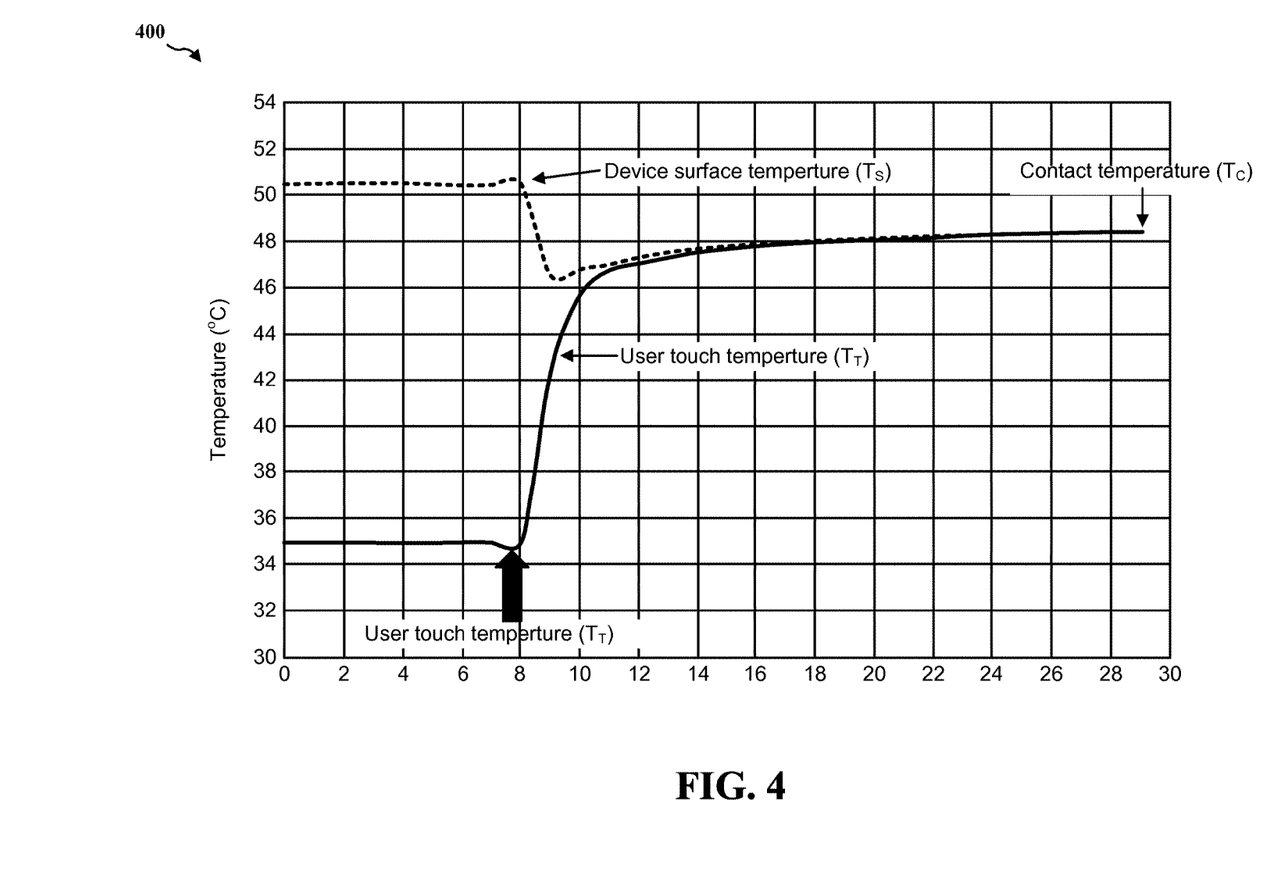
FIG. 4 is a graph of an example transient thermal response when a finger touches an external surface of a device.

FIG. 4 is a graph of an example transient thermal response when a finger touches an external surface of a device. The graph shows that upon contact between the finger and the surface, the surface temperature of the device decreases rapidly while the touch temperature increases quickly. After touching for 3 seconds, the surface temperature and the touch temperature obtain a thermal steady state condition and converge to a contact temperature.

With reference to FIG. 3, in accordance with embodiments disclosed herein, a porous and thermally conductive material 306, 308, 310 is associated with at least one of the plurality of sides 114, 116, 120 of the housing 106. The porous and thermally conductive material 306, 308, 310 is designed to have properties, e.g., thermal conductivity (k), a density ($\rho$), and a specific heat ($C_p$), that maintain a surface temperature ($T_S$) at the exterior surface 304 of the at least one side 114, 116, 120 of the housing 106 in a range between 30 C and 60 C, or in a range between 36 C and 45 C, or at or near average human body temperature (e.g., 37.5 C), during a steady state operation of the device. To this end, a material having an intrinsic thermal conductivity (k) may be designed and made to have a porosity that results in a porous and thermally conductive skin material having a density ($\rho$) and a specific heat ($C_p$) such that the product $k*\rho*C_p$ for the skin material is between 0 $(J*W)/(m^4*K^2)$ and 1,000,000 $(J*W)/(m^4*K^2)$. In the foregoing product $k*\rho*C_p$, the variables are: joules (J), watts (W), meters (m) and Kelvin (K).

Regarding the upper end of the range of $k*\rho*C_p$, human skin has a thermal conductivity (k) of approximately 0.23 W/m-K, a density ($\rho$) of approximately 1200 kg/m$^3$ and a specific heat ($C_p$) of approximately 3590 J/kg-K. In the foregoing material properties, the variables are: joules (J), watts (W), meters (m), kilogram (kg), and Kelvin (K). The product $k*\rho*C_p$ for human skin is thus approximately 990,000 $(J*W)/(m^4*K^2)$. In accordance with aspects of the material designs disclosed herein, the skin material is designed to have a product $k*\rho*C_p$ that is around or less than the product $k*\rho*C_p$ for human skin, e.g., between 0 $(J*W)/(m^4*K^2)$ and 1,000,000 $(J*W)/(m^4*K^2)$.

Maintaining the surface temperature ($T_S$) at the exterior surface 304 within these temperature ranges, ensures that the transient thermal response (such as shown in FIG. 4) between a user and the device will result in a contact temperature $T_C$ within these same temperature range of 30 C and 60 C. Steady state operation in this context means that the device is operating under normal operation and environmental conditions. In other words, the device is not experiencing any operation abnormalities that are causing internal components to overheat, and the device is not exposed to a high ambient temperature, e.g., direct sunlight in a high temperature environment.

With reference to FIG. 3, in one configuration, the porous and thermally conductive material associated with the sides of the housing is a layer 306 of material on one or both of the interior surface and exterior surface of the side 120. The layer 306 of material may have a thickness in the range of 100 microns and 1.00 mm. The material may be associated with all sides of the housing 106 to thereby provide a device with a housing that is entirely coated, either internally, externally, or both internally and externally, with the material. In other configurations, the porous and thermally conductive material 308 associated with the sides of the housing 106 forms the entire side 114 of the housing. In this case, the side of material may have a thickness in the range of 50 μm to 100 mm. The material 308 may form all sides of the housing 106 to thereby provide a device with a housing that is formed entirely of the material.

The porous and thermally conductive material 306, 308, 310 associated with the sides of the housing may be a metal, a glass, a plastic, e.g., polyethylene, or a combined metal/plastic material. For example, with reference to FIG. 1 and FIG. 3, the entire top side 116 of the housing 106, or at least the display portion 118 of the top side, may be formed of porous glass 310; while the first side 108, second side 110, third side 112, fourth side 114 and bottom side 120 of the housing may be formed of a porous metal 308, such as porous aluminum, or a porous plastic, such as porous polyethylene.

A glass-based skin material may have a thermal conductivity (k) between 0.5-2 W/m-K, a density (ρ) between 1000-2500 kg/m$^3$, and a specific heat ($C_p$) between 500-1000 J/kg-K. As described above, the glass-based skin material may be designed and made to have a porosity that results in a glass-based skin material having a density (ρ) and a specific heat (CO such that the product $k*ρ*C_p$ for the end glass-based skin material is between 0 (J*W)/(m$^4$*K$^2$) and 1,000,000 (J*W)/(m$^4$*K$^2$). This combination of properties of a glass-based skin material may be obtained by structuring the material to have a porosity between 10% and 70%. In one material design, the material may have a porosity between 30% and 50%, and may be fabricated using material particles sized between 100 and 200 μm.

With continued reference to FIG. 3, in one example housing configuration, a glass-based skin material 310 may be associated with the top side 116 of the housing 106. For example, the glass-based skin material 310 may be used to form the display portion 118 of the top side 116 of the housing 106. In another example, the glass-based skin material 310 may be used to form the entire top side 116 including the display portion 118. The top side or the display portion may be formed using well known techniques, such as sintering. In yet another example, the glass-based skin material may be applied as a layer on the entire top side 116 or at least on the display portion 118 of the top side. The layer may be applied to the side using well known techniques, such as compression molding.

A metal-based skin material may have a thermal conductivity between 300-400 W/m-K, a density between 4000-8000 kg/m$^3$, and a specific heat between 200-300 J/kg-K. As described above, the metal-based skin material may be designed and made to have a porosity that results in a metal-based skin material having a density (ρ) and a specific heat ($C_p$) such that the product $k*ρ*C_p$ for the end metal-based skin material is between 0 (J*W)/(m$^4$*K$^2$) and 1,000,000 (J*W)/(m$^4$*K$^2$).) This combination of material properties of a metal-based skin material may be obtained by structuring the material to have a porosity between 10% and 70%. In one design, the material may have a porosity between 30% and 50%, and may be fabricated using material particles sized between 100 and 200 μm.

A plastic-based material may have a thermal conductivity may between 0.1-0.4 W/m-K, a density between 900-1000 kg/m$^3$, and a specific heat between 1900-2000 J/kg-K. As described above, the plastic-based skin material may be designed and made to have a porosity that results in a plastic-based skin material having a density (ρ) and a specific heat ($C_p$) such that the product $k*ρ*C_p$ for the end metal-based skin material is between 0 (J*W)/(m$^4$*K$^2$) and 1,000,000 (J*W)/(m$^4$*K$^2$). This combination of material properties of a plastic-based material may be obtained by structuring the material to have a porosity between 10% and 70%. In one design, the material may have a porosity between 30% and 50%, and may be fabricated using material particles sized between 100 and 200 μm.

With reference to FIG. 1, in one example housing configuration, a metal-based, plastic-based, or combined metal/plastic-based skin material may be associated with first side 108, second side 110, third side 112, fourth side 114, and bottom side 120 of the housing. For example, as shown in FIG. 3, a metal-based, plastic-based or combined metal/plastic-based skin material may applied as a layer 306 on the bottom side 120, or the material 308 may be used to form one or more sides, such as the fourth side 114.

With continued reference to FIG. 3, heat dissipated by the electronic components 202, 204 creates junction temperatures ($T_J$) at the interior surfaces 302 of the sides 114, 116, 120. Accordingly, the skin material of the device is further configured to have a density, thermal conductivity, and specific heat that maintain these junction temperatures below a threshold level. For example, if the electronic device has a number of electronic components 202, 204 and each component is able to operate in or at a temperature not exceeding 100 C, then the material may be configured to maintain the junction temperature below 100 C.

The skin materials disclosed herein are designed to balance the need to allow heat from within a device to dissipate to the device surface so the device may continue to operate properly, with the need to maintain surface temperatures within an acceptable range to ensure user comfort. To this end, example skin materials designed to achieve the forgoing include a porous polyethylene, having a smooth surface of between 30-50 microns, a thickness of 1.00 mm, a porosity of 40-50% and a particle size of approximately 100 um (referred to as "material A"), and a porous polyethylene, having a coarse surface of between 100-200 microns, a thickness of 1.00 mm, a porosity of 40-50% and a particle size of approximately 100 um (referred to as "material B"). Each of material A and material B has a thermal conductivity (k) between 0.1-0.15 W/m-K, a density (ρ) of about 470 kg/m$^3$, and a specific heat ($C_p$) of about 950 W/m-K. Based on these material properties, the product $k*ρ*C_p$ for materials A and B may be between 44,650 (J*W)/(m$^4$*K$^2$) and 66,975 (J*W)/(m$^4$*K$^2$).

The surface texture may be adjusted by surface grinding/polishing to obtain a desired smoothness. Surface texture may also be controlled by the particle size used to form the skin. In the foregoing example skin materials, the same particle size was used for material A and material B. Material A was provided with a smooth surface of between 30-50 microns through surface grinding/polishing.

Testing of these skin materials was performed against a conventional material, formed of solid polycarbonate-based plastic, with a smooth surface, having a thermal conductivity (k) of about 0.3 W/m-K, a density ($\rho$) of about 9400 kg/m$^3$, and a specific heat ($C_p$) of about 1900 W/m-K. Based on these material properties, the product k*$\rho$*$C_p$ for the conventional material is approximately 5,358,000 (J*W)/(m$^4$*K$^2$). The testing was performed by placing each of the conventional material, material A and material B on the back cover of a respective smartphone and running the smartphone for 30 minutes to stress the CPU. The junction temperatures of the CPU chips and the surface temperature on the back covers were measured, and the thermal performance of material A and material B was evaluated against the conventional material by comparing these thermal metrics. The testing produced the following results:

After running a smartphone at 1350 Mhz for 30 minutes:

Material A provided a junction temperature of 97 C and a surface temperature of 47.3 C, while the conventional material provided a junction temperature of 90 C and a surface temperature of 53.8 C. In this case, when compared to the conventional material, material A reduced the surface temperature by 7 C. Although the junction temperature increased by 6.5 C relative to the conventional material, the increase did not result in a junction temperature that exceeded acceptable operating conditions.

After running a smartphone at 1350 Mhz for 30 minutes:

Material B provided a junction temperature of 98 C and a surface temperature of 46 C, while the conventional material provided a junction temperature of 89 C and a surface temperature of 53.9 C. In this case, when compared to the conventional material, material A reduced the surface temperature by 7.9 C. Although the junction temperature increased by 9 C relative to the conventional material, the increase did not result in a junction temperature that exceeded acceptable operating conditions.

With reference to FIG. 1 and FIG. 3, disclosed herein is an electronic device 100 that include a housing 106 defined by a plurality of sides 108, 110, 112, 114, 120, and electronics components 202, 204, 206 contained in the housing. A porous and thermally conductive material 306, 308, 310 may be associated with at least one of the plurality of sides of the housing 106. The material 306, 308, 310 has a thermal conductively (k), and a porosity of between 10% and 70% that results in a specific heat ($\rho$) and density ($C_p$) for the material, such that a product k*$\rho$*$C_p$ is between 0 (J*W)/(m$^4$*K$^2$) and 1,000,000 (J*W)/(m$^4$*K$^2$). The material 306, 308, 310 may comprise one of: a glass-based material having a thermal conductivity between 0.5-2 W/m-K, a density between 1000-2500 kg/m$^3$, and a specific heat between 500-1000 J/kg-K; a metal-based material having a thermal conductivity between 300-400 W/m-K, a density between 4000-8000 kg/m$^3$, and a specific heat between 200-300 J/kg-K; and a plastic-based material having a thermal conductivity may be between 0.1-0.4 W/m-K, a density between 400-1000 kg/m$^3$, and a specific heat between 1900-2000 J/kg-K.

Figure 5:
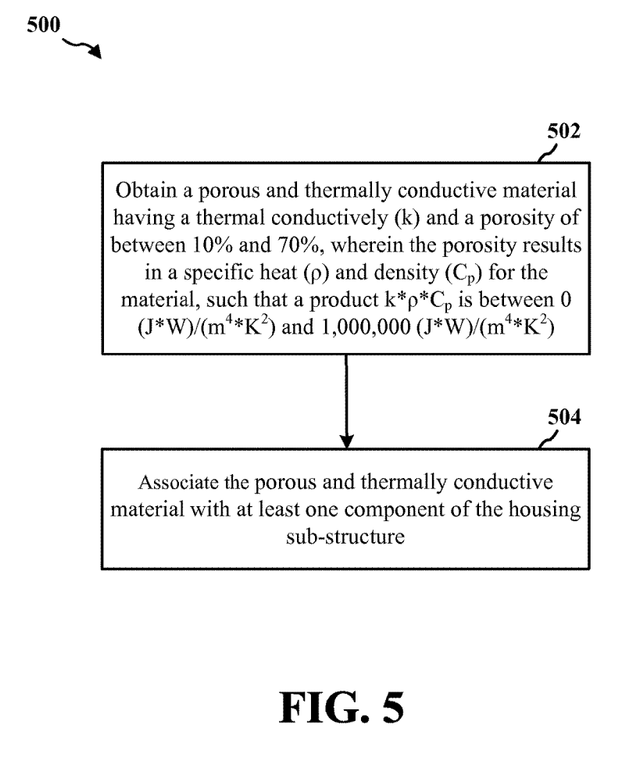
FIG. 5 is a flow chart of a method of making a housing sub-structure for an electronic device.

FIG. 5 is a flow chart 500 of a method of making a housing sub-structure for an electronic device. The housing sub-structure may include one or more housing components 108, 110, 112, 114, 116, 120. For example, with reference to FIG. 1, a housing sub-structure may have a first side 108, a second side 110, a third side 112, a fourth side 114 and a bottom side 120. In one configuration, the housing sub-structure may be a unitary structure defined by housing components 108, 110, 112, 114, 120 and formed using known manufacturing techniques, such as molding. In another configuration, the housing sub-structure may be formed of housing components 108, 110, 112, 114, 120 that are individually fabricated and then assembled to form the housing sub-structure. In yet another configuration, the housing sub-structure may be a single housing component. For example, the top side 116 of a housing may define a housing sub-structure.

With reference to FIG. 5, at step 502, a porous and thermally conductive material is obtained. The material has a thermal conductively (k) and a porosity of between 10% and 70%, wherein the porosity results in a specific heat ($\rho$) and density ($C_p$) for the material, such that a product k*$\rho$*$C_p$ is between 0 (J*W)/(m$^4$*K$^2$) and 1,000,000 (J*W)/(m$^4$*K$^2$). The material may be one of: a glass-based material having a thermal conductivity between 0.5-2 W/m-K, a density between 1000-2500 kg/m$^3$, and a specific heat between 500-1000 J/kg-K; a metal-based material having a thermal conductivity between 300-400 W/m-K, a density between 4000-8000 kg/m$^3$, and a specific heat between 200-300 J/kg-K; and a plastic-based material having a thermal conductivity may be between 0.1-0.4 W/m-K, a density between 400-1000 kg/m$^3$, and a specific heat between 1900-2000 J/kg-K.

At step 504, the porous and thermally conductive material is associated with at least one component of the housing sub-structure. Association may occur by applying a layer of the material to the component or through formation of the component using the material. In the case of association, the at least one component may have an interior surface and an exterior surface and associating the material with the at least one component may include applying a layer of the material on one or both of the interior surface and the exterior surface of the component. The thickness of the layer may range between 100 microns and 1.00 mm. In the case of forming the housing substructure of the material, the thickness of the at least one component formed of the material may range between 50 μm and 100 mm.

Fabrication of the foregoing skin materials may be done using known methods, including for example, sintering. Sintering technology is used to fabricate porous materials. During sintering processes, material particles are held in a mold and then heated to a temperature below the melting point. The atoms in the particles diffuse across the boundaries of the particles, fusing the particles together and creating one solid piece. As described above, the porosity of a material can be controlled by particle size. Porosity may be further controlled based on packing density.

Figure 6:
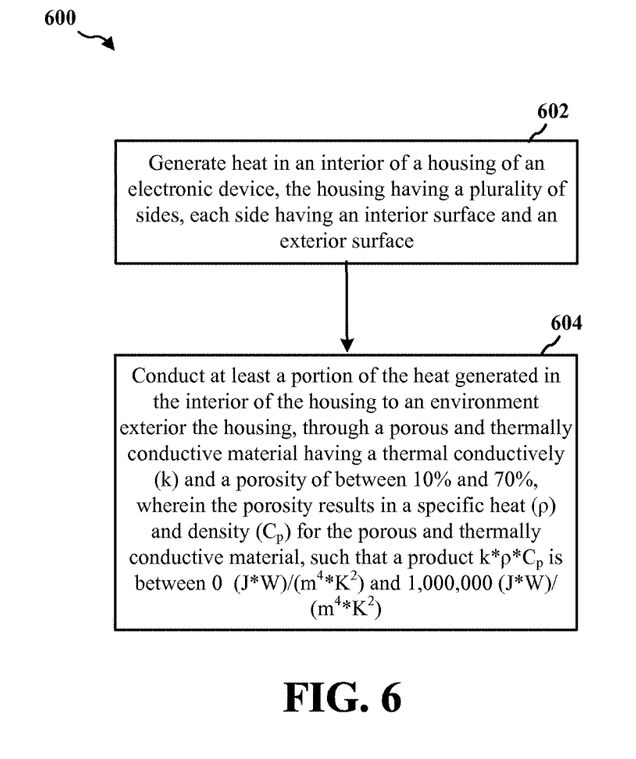
FIG. 6 is a flow chart of a method of operating an electronic device.

FIG. 6 is a flow chart 600 of a method of operating an electronic device. At step 602, heat is generated in an interior of a housing of the electronic device. The housing has a plurality of sides, and each side has an interior surface and an exterior surface. The housing of the electronic device may include electronic components and generating heat in the interior of the housing may include dissipating heat from at least one electronic component within the housing.

At step 604, at least a portion of the heat generated in the interior of the housing is conducted to an environment exterior the housing. The conducting may occur through a porous and thermally conductive material associated with at least one of the plurality of sides of the housing. The material has a thermal conductively (k) and a porosity of between 10% and 70%, wherein the porosity results in a specific heat (ρ) and density ($C_p$) for the porous and thermally conductive material, such that a product $k*\rho*C_p$ is between 0 $(J*W)/(m^4*K^2)$ and 1,000,000 $(J*W)/(m^4*K^2)$. In one configuration, the porosity of the porous and thermally conductive material is between 30% and 50%.

The porous and thermally conductive material may be one of: a glass-based material having a thermal conductivity between 0.5-2 W/m-K, a density between 1000-2500 kg/m³, and a specific heat between 500-1000 J/kg-K; a metal-based material having a thermal conductivity between 300-400 W/m-K, a density between 4000-8000 kg/m³, and a specific heat between 200-300 J/kg-K; and a plastic-based material having a thermal conductivity may be between 0.1-0.4 W/m-K, a density between 400-1000 kg/m³, and a specific heat between 1900-2000 J/kg-K.

In one configuration, the porous and thermally conductive material may be a layer associated with one or both of the interior surface and the exterior surface of the at least one of the plurality of sides of the housing. In another configuration, the porous and thermally conductive material may form the at least one of the plurality of sides. In yet another configuration, the porous and thermally conductive material may form an entirety of the housing.

In an aspect of the method of FIG. 6, the heat generated in the interior of the housing creates a junction temperature at the interior surface of the at least one side of the housing, and conducting at least a portion of the heat generated in the interior of the housing includes maintaining a surface temperature at the exterior surface of the at least one side in a range between 30 C and 60 C during a steady state operation of the electronic device, and maintaining the junction temperature below a threshold level.

Figure 7:
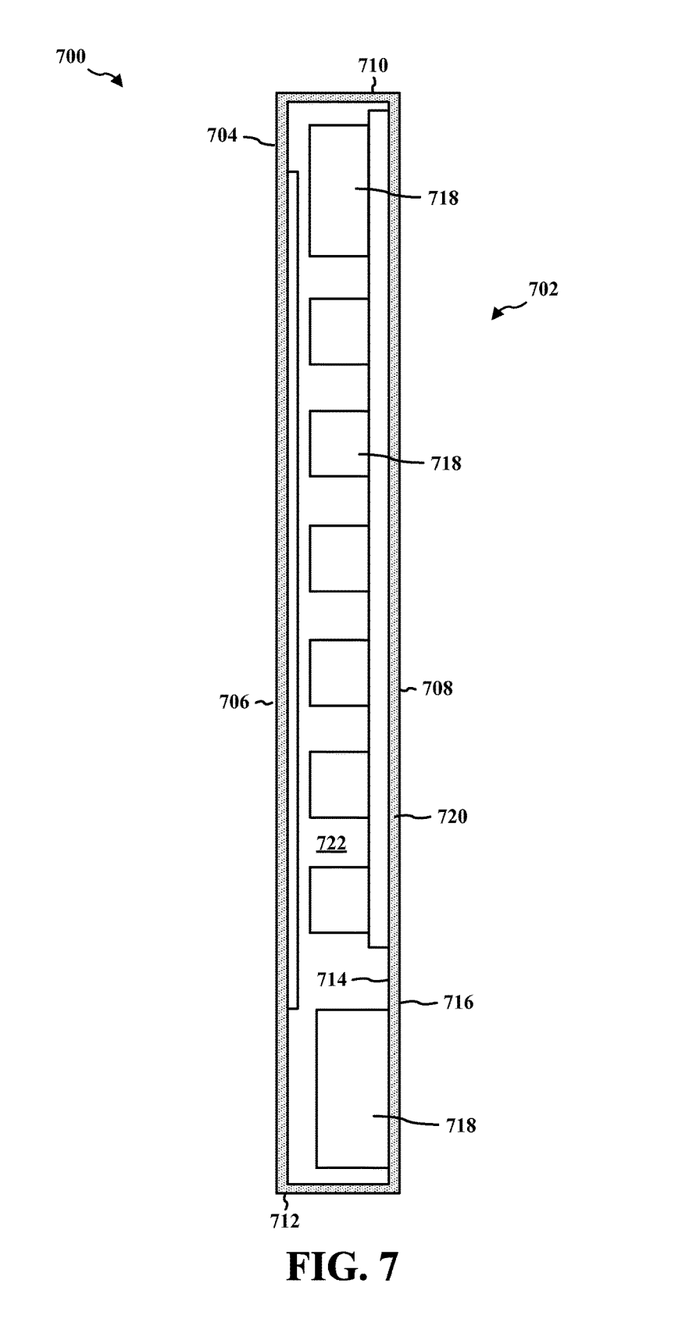
FIG. 7 is an illustration of a side view, with interior components exposed, of an electronic device configured to implement the method of FIG. 6.

FIG. 7 is an illustration 700 of a side view, with interior components exposed, of an electronic device 702 configured in accordance with aspects disclosed herein to implement the method of FIG. 6. The electronic device 702 may include means for generating heat in an interior 722 of a housing 704 of the electronic device. The housing 704 may have a plurality of sides 706, 708, 710, 712, each having an interior surface 714 and an exterior surface 716. The means for generating heat in the interior 722 of the housing 704 may include one or more electronic components 718 within the housing that are configured to dissipate heat.

The electronic device 702 may further include means for conducting at least a portion of the heat generated in the interior 722 of the housing 704 to an environment exterior the housing. The means for conducting may comprise a porous and thermally conductive material 720 associated with at least one of the plurality of sides 706, 708, 710, 712 of the housing 704. The material 720 may have a thermal conductively (k) and a porosity of between 10% and 70%, wherein the porosity results in a specific heat (ρ) and density ($C_p$) for the porous and thermally conductive material, such that a product $k*\rho*C_p$ is between 0 $(J*W)/(m^4*K^2)$ and 1,000,000 $(J*W)/(m^4*K^2)$. The porosity of the porous and thermally conductive material 720 may be between 30% and 50%. In one configuration, the porous and thermally conductive material 720 may be a layer associated with one or both of the interior surface and the exterior surface of the at least one of the plurality of sides 706, 708, 710, 712 of the housing 704. In another configuration, the porous and thermally conductive material 720 may form the at least one of the plurality of sides 706, 708, 710, 712 of the housing 704.

In yet another configuration, the porous and thermally conductive material 720 may form an entirety of the housing 704.

The porous and thermally conductive material 720 may be at least one of: a glass-based material having a thermal conductivity between 0.5-2 W/m-K, a density between 1000-2500 kg/m³, and a specific heat between 500-1000 J/kg-K; a metal-based material having a thermal conductivity between 300-400 W/m-K, a density between 4000-8000 kg/m³, and a specific heat between 200-300 J/kg-K; and a plastic-based material having a thermal conductivity may be between 0.1-0.4 W/m-K, a density between 400-1000 kg/m³, and a specific heat between 1900-2000 J/kg-K.

The heat generated by the means for generating heat in the interior 722 of the housing 704 creates a junction temperature at the interior surface 714 of the at least one of the plurality of sides 706, 708, 710, 712. The means for conducting at least a portion of the heat generated in the interior 714 of the housing 704 is configured to maintain a surface temperature at the exterior surface 716 of the at least one of the plurality of sides 706, 708, 710, 712 of the housing in a range between 30 C and 60 C during a steady state operation of the electronic device, and to maintain the junction temperature below a threshold level.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An electronic device, comprising:
   a housing having a plurality of sides, each side having an interior surface and an exterior surface;
   electronic components contained within the housing; and
   a porous and thermally conductive material associated with at least one of the plurality of sides of the housing, the material having a thermal conductivity (k) and a porosity of between 10% and 70%, wherein the porosity results in a specific heat ($C_p$) and density ($\rho$) for the porous and thermally conductive material, such that a product $k*\rho*C_p$ is between 0 $(J*W)/(m^4*K^2)$ and 1,000,000 $(J*W)/(m^4*K^2)$.

2. The electronic device of claim 1, wherein the porous and thermally conductive material comprises at least one of:
   a glass-based material having a thermal conductivity between 0.5-2 W/m-K, a density between 1000-2500 kg/m$^3$, and a specific heat between 500-1000 J/kg-K,
   a metal-based material having a thermal conductivity between 300-400 W/m-K, a density between 4000-8000 kg/m$^3$, and a specific heat between 200-300 J/kg-K, and
   a plastic-based material having a thermal conductivity may be between 0.1-0.4 W/m-K, a density between 400-1000 kg/m$^3$, and a specific heat between 1900-2000 J/kg-K.

3. The electronic device of claim 2, wherein the porosity of the glass-based material, the metal-based material, or the plastic-based material is between 30% and 50%.

4. The electronic device of claim 1, wherein the plurality of sides are substantially planar.

5. The electronic device of claim 1, wherein the porous and thermally conductive material comprises a layer associated with one or both of the interior surface and the exterior surface of the at least one of the plurality of sides.

6. The electronic device of claim 5, wherein the layer has a thickness between 100 microns and 1.00 mm.

7. The electronic device of claim 1, wherein the porous and thermally conductive material forms the at least one of the plurality of sides.

8. The electronic device of claim 7, wherein the at least one of the plurality of sides formed of the porous and thermally conductive material has a thickness between 50 μm and 100 mm.

9. The electronic device of claim 1, wherein the porous and thermally conductive material forms an entirety of the housing.

10. The electronic device of claim 1, wherein heat dissipated by the electronic components creates a junction temperature at the interior surface of the at least one of the plurality of sides, and the porous and thermally conductive material is configured to maintain a surface temperature at the exterior surface of the at least one of the plurality of sides in a range between 30 C and 60 C during a steady state operation of the electronic device, and to maintain the junction temperature below a threshold level.

11. The electronic device of claim 10, wherein the surface temperature is maintained at or near average human body temperature (37.5 C).

12. A method of operating an electronic device, comprising:
   generating heat in an interior of a housing of the electronic device, the housing having a plurality of sides, each side having an interior surface and an exterior surface; and
   conducting at least a portion of the heat generated in the interior of the housing to an environment exterior the housing, the conducting occurring through a porous and thermally conductive material associated with at least one of the plurality of sides of the housing, the material having a thermal conductivity (k) and a porosity of between 10% and 70%, wherein the porosity results in a specific heat ($C_p$) and density ($\rho$) for the porous and thermally conductive material, such that a product $k*\rho*C_p$ is between 0 $(J*W)/(m^4*K^2)$ and 1,000,000 $(J*W)/(m^4*K^2)$.

13. The method of claim 12, wherein the porous and thermally conductive material comprises at least one of:
   a glass-based material having a thermal conductivity between 0.5-2 W/m-K, a density between 1000-2500 kg/m$^3$, and a specific heat between 500-1000 J/kg-K,
   a metal-based material having a thermal conductivity between 300-400 W/m-K, a density between 4000-8000 kg/m$^3$, and a specific heat between 200-300 J/kg-K, and
   a plastic-based material having a thermal conductivity may be between 0.1-0.4 W/m-K, a density between 400-1000 kg/m$^3$, and a specific heat between 1900-2000 J/kg-K.

14. The method of claim 13, wherein the porosity of the glass-based material, the metal-based material, or the plastic-based material is between 30% and 50%.

15. The method of claim 12, wherein the porous and thermally conductive material comprises a layer associated with one or both of the interior surface and the exterior surface of the at least one of the plurality of sides.

16. The method of claim 12, wherein the porous and thermally conductive material forms the at least one of the plurality of sides.

17. The method of claim 12, wherein the porous and thermally conductive material forms an entirety of the housing.

18. The method of claim 12, wherein the heat generated in the interior of the housing creates a junction temperature at the interior surface of the at least one of the plurality of sides, and conducting at least a portion of the heat generated in the interior of the housing comprises maintaining a surface temperature at the exterior surface of the at least one of the plurality of sides in a range between 30 C and 60 C during a steady state operation of the electronic device, and maintaining the junction temperature below a threshold level.

19. The method of claim 12, wherein generating heat in the interior of the housing comprises dissipating heat from at least one electronic component within the housing.

20. An electronic device, comprising:
   means for generating heat in an interior of a housing of the electronic device, the housing having a plurality of sides, each side having an interior surface and an exterior surface; and
   means for conducting at least a portion of the heat generated in the interior of the housing to an environment exterior the housing, wherein the means for conducting comprises a porous and thermally conductive material associated with at least one of the plurality of sides of the housing, the material having a thermal conductivity (k) and a porosity of between 10% and 70%, wherein the porosity results in a specific heat ($C_p$) and density ($\rho$) for the porous and thermally conductive material, such that a product $k*\rho*C_p$ is between 0 $(J*W)/(m^4*K^2)$ and 1,000,000 $(J*W)/(m^4*K^2)$.

21. The electronic device of claim 20, wherein the porous and thermally conductive material comprises at least one of:

a glass-based material having a thermal conductivity between 0.5-2 W/m-K, a density between 1000-2500 kg/m$^3$, and a specific heat between 500-1000 J/kg-K, a metal-based material having a thermal conductivity between 300-400 W/m-K, a density between 4000-8000 kg/m$^3$, and a specific heat between 200-300 J/kg-K, and a plastic-based material having a thermal conductivity may be between 0.1-0.4 W/m-K, a density between 400-1000 kg/m$^3$, and a specific heat between 1900-2000 J/kg-K.

22. The electronic device of claim 21, wherein the porosity of the glass-based material, the metal-based material, or the plastic-based material is between 30% and 50%.

23. The electronic device of claim 20, wherein the porous and thermally conductive material comprises a layer associated with one or both of the interior surface and the exterior surface of the at least one of the plurality of sides.

24. The electronic device of claim 20, wherein the porous and thermally conductive material forms the at least one of the plurality of sides.

25. The electronic device of claim 20, wherein the porous and thermally conductive material forms an entirety of the housing.

26. The electronic device of claim 20, wherein the heat generated in the interior of the housing creates a junction temperature at the interior surface of the at least one of the plurality of sides, and the means for conducting at least a portion of the heat generated in the interior of the housing is configured to maintain a surface temperature at the exterior surface of the at least one of the plurality of sides in a range between 30 C and 60 C during a steady state operation of the electronic device, and maintain the junction temperature below a threshold level.

27. The electronic device of claim 20, wherein the means for generating heat in the interior of the housing comprises at least one electronic component within the housing, the at least one electronic component configured to dissipate heat.

28. A housing sub-structure for an electronic device, comprising:
at least one component; and
a porous and thermally conductive material associated with the at least one component, the material having a thermal conductivity (k) and a porosity of between 10% and 70%, wherein the porosity results in a specific heat ($C_p$) and density ($\rho$) for the porous and thermally conductive material, such that a product $k*\rho*C_p$ is between 0 (J*W)/(m$^4$*K$^2$) and 1,000,000 (J*W)/(m$^4$*K$^2$).

29. The housing sub-structure of claim 28, wherein the porous and thermally conductive material comprises at least one of:
a glass-based material having a thermal conductivity between 0.5-2 W/m-K, a density between 1000-2500 kg/m$^3$, and a specific heat between 500-1000 J/kg-K,
a metal-based material having a thermal conductivity between 300-400 W/m-K, a density between 4000-8000 kg/m$^3$, and a specific heat between 200-300 J/kg-K, and
a plastic-based material having a thermal conductivity may be between 0.1-0.4 W/m-K, a density between 400-1000 kg/m$^3$, and a specific heat between 1900-2000 J/kg-K.

30. The housing sub-structure of claim 29, wherein the porous and thermally conductive material comprises a layer associated with one or more surfaces of the at least one component.

31. The housing sub-structure of claim 30, wherein the layer has a thickness between 100 microns and 1.00 mm.

32. The housing sub-structure of claim 29, wherein the porous and thermally conductive material forms the at least one component.

33. The housing sub-structure of claim 32, wherein the at least one component formed of the porous and thermally conductive material has a thickness between 50 µm and 100 mm.

34. The housing sub-structure of claim 29, wherein the porous and thermally conductive material is associated with a plurality of sides that form an entirety of a housing.

35. The housing sub-structure of claim 29, wherein the housing sub-structure comprises a single unitary component defining a side or a plurality of sides of a housing.

36. The housing sub-structure of claim 29, wherein the housing sub-structure comprises a plurality of components assembled to define a plurality of sides of a housing.

37. A method of making a housing sub-structure for an electronic device, said method comprising:
obtaining a porous and thermally conductive material having a thermal conductivity (k) and a porosity of between 10% and 70%, wherein the porosity results in a specific heat ($C_p$) and density ($\rho$) for the porous and thermally conductive material, such that a product $k*\rho*C_p$ is between 0 (J*W)/(m$^4$*K$^2$) and 1,000,000 (J*W)/(m$^4$*K$^2$); and
associating the porous and thermally conductive material with at least one component.

38. The method of claim 37, wherein the porous and thermally conductive material comprises at least one of:
a glass-based material having a thermal conductivity between 0.5-2 W/m-K, a density between 1000-2500 kg/m$^3$, and a specific heat between 500-1000 J/kg-K,
a metal-based material having a thermal conductivity between 300-400 W/m-K, a density between 4000-8000 kg/m$^3$, and a specific heat between 200-300 J/kg-K, and
a plastic-based material having a thermal conductivity may be between 0.1-0.4 W/m-K, a density between 400-1000 kg/m$^3$, and a specific heat between 1900-2000 J/kg-K.

39. The method of claim 37, wherein the at least one component comprise an interior surface and an exterior surface and associating the porous and thermally conductive material with the at least one component comprises applying a layer of the porous and thermally conductive material on one or both of the interior surface and the exterior surface of the at least one component.

40. The method of claim 39, wherein the layer has a thickness between 100 microns and 1.00 mm.

41. The method of claim 37, wherein associating the porous and thermally conductive material with the at least one component comprises forming the at least one component with the porous and thermally conductive material.

42. The method of claim 41, wherein the at least one component formed of the porous and thermally conductive material has a thickness between 50 µm and 100 mm.

43. A skin material for a housing of an electronic device, said skin material comprising:
particles of a base material processed to form a porous and thermally conductive end material having a thermal conductivity (k) and a porosity of between 10% and 70%, wherein the porosity results in a specific heat ($C_p$) and density ($\rho$) for the skin material, such that a product $k*\rho*C_p$ is between 0 (J*W)/(m$^4$*K$^2$) and 1,000,000 (J*W)/m$^4$*K$^2$).

44. The skin material of claim 43, comprising one of:
- a glass-based material having a thermal conductivity between 0.5-2 W/m-K, a density between 1000-2500 kg/m$^3$, and a specific heat between 500-1000 J/kg-K,
- a metal-based material having a thermal conductivity between 300-400 W/m-K, a density between 4000-8000 kg/m$^3$, and a specific heat between 200-300 J/kg-K, and
- a plastic-based material having a thermal conductivity may be between 0.1-0.4 W/m-K, a density between 400-1000 kg/m$^3$, and a specific heat between 1900-2000 J/kg-K.

45. The skin material of claim 43, wherein the particles are sized between 100 μm and 200 μm.

46. The skin material of claim 43, comprising a polyethylene material having a porosity between 40% and 50%, a thermal conductivity between 0.1-0.15 W/m-K, a density of about 470 kg/m$^3$, and a specific heat of about 950 W/m-K.

\* \* \* \* \*